UNITED STATES PATENT OFFICE.

LESTER KIRSCHBRAUN, OF EVANSTON, ILLINOIS.

PROCESS OF MAKING EMULSION.

1,417,835.     Specification of Letters Patent.     Patented May 30, 1922.

No Drawing.     Application filed February 1, 1919. Serial No. 274,497.

*To all whom it may concern:*

Be it known that I, LESTER KIRSCHBRAUN, a citizen of the United States, residing in the city of Evanston, county of Cook, and State of Illinois, have invented certain new and useful Improvements in the Processes of Making Emulsions, of which the following is a specification.

This invention relates to improvements in the process of making emulsions, and refers more particularly to a process of making emulsified bituminous matrix suitable for mixing with fibre and forming into sheets or plastic compositions. Among the salient objects of the invention are to provide a process in which the emulsion may be formed continuously and rapidly, and the stock being continuously drawn off as fresh supplies are had; to provide a process in which the ingredients are emulsified by passing them through an atomizer, thereby obtaining a very fine dispersion of the adhesive binder with emulsifying agent and water, and, in general, to provide an improvement of the character referred to.

The emulsified matrix formed by the invention consists essentially of an adhesive binder, an emulsifying agent and a liquid vehicle. The adhesive binder may consist of a bitumen, such as asphalt, although many other binders may be used, as, for example, animal and vegetable pitches, combinations of linseed oil with gums, and other drying or non-drying oils. I have found that clay containing a substantial percentage of colloidal particles makes a satisfactory emulsifying agent, although other emulsifying agents containing colloidal particles may be used. Water is the cheapest and most satisfactory vehicle.

The emulsion made by this process may consist, by weight, of fifty parts asphalt, forty parts water and ten parts clay, although the proportions may be varied. The emulsion is so formed that the asphalt is in the internal phase and the clay and water in the external phase. The object is to form a non-adhesive emulsion.

Where large quantities of this emulsion are required, I continuously form the fresh emulsion while drawing off that already formed. In a tank containing rapidly revolving paddles is formed a relatively stiff aqueous paste, consisting of water and clay containing a substantial percentage of colloidal particles. To this paste is added bitumen while in a fluid, heated condition, the paste also being in heated condition. The bitumen and the aqueous paste are thoroughly amalgamated to form an emulsion by the continuous action of the revolving paddles. After a bulk supply of material has been formed in the manner described, fresh aqueous paste may be fed from a spout, this paste being relatively thin. Simultaneously heated liquid bitumen may be fed from another spout as for example a pipe. As these ingredients mix with the bulk supply, they are thoroughly agitated, become emulsified and are uniformly distributed throughout the mass. As the fresh ingredients are added through the spouts in the manner described, the finished emulsion may be continuously drawn off from, at or near the bottom of the tank. Instead of passing the liquid bitumen and paste through the spouts heretofore described, the aqueous paste and bitumen may be passed through an atomizing nozzle, thoroughly mixing with each other and forming an emulsion before they pass into the tank. A nozzle similar to the nozzle of a fuel oil burner may be used. Each ingredient is forced by pressure through the nozzle in a heated condition. The emulsion is injected through this nozzle into the tank and is there more uniformly mixed by the revolving paddles. The object of using this nozzle is to form an extremely fine dispersion of the asphalt through the aqueous paste. This also permits of the emulsion being formed very rapidly. The emulsion, as it is drawn into the tank, is ready to be mixed with the fibre, and then formed into sheets on a suitable paper or other machine.

I claim as my invention:

1. A process of making a non-adhesive emulsion consisting in first forming a bulk supply by making an aqueous mixture of water and an emulsifying agent, colloidal clay, adding a waterproof bituminous binder, thoroughly amalgamating these ingredients into an emulsion in which the asphalt is in the internal phase and the emulsifying agent and water in the external phase, feeding the relatively thin aqueous mixture containing such emulsifying agent in a regulated stream and also a waterproof bituminous binder, while the latter is in a heated liquid condition, to said bulk supply and agitating the bulk supply while forming the fresh emulsion and withdrawing the fresh product therefrom.

2. A process of making a non-adhesive emulsion consisting in first forming a bulk supply by making an aqueous mixture of water and an emulsifying agent, adding a waterproof bituminous binder, thoroughly amalgamating these ingredients into an emulsion in which the asphalt is in the internal phase and the emulsifying agent and water in the external phase, feeding relatively thin aqueous mixture containing such emulsifying agent in a regulated stream and also a waterproof bituminous binder, while the latter is in a heated liquid condition, to said bulk supply and agitating the bulk supply while forming the fresh emulsion and withdrawing the fresh product therefrom.

3. A process of making a non-adhesive emulsion consisting in first forming a bulk supply by making an aqueous mixture of water and an emulsifying agent, adding a waterproof adhesive, pitchy binder, thoroughly mixing these ingredients to form an emulsion in which the binder forms the internal phase and the emulsifying agent and water the external phase, then continuously feeding the emulsifying agent contained in the water in a regulated stream and also the binder in a regulated stream while the latter is in liquid condition to said bulk supply, and agitating such bulk supply and mixing the incoming streams therewith.

4. A process of making an emulsion, consisting in first forming a bulk supply by making an aqueous mixture of water and an emulsifying agent, adding a waterproof adhesive binder, thoroughly mixing these ingredients into an emulsion in which the binder forms the internal phase and the emulsifying agent and water the external phase, feeding a regulated stream of the emulsifying agent mixed with the water and also a regulated stream of the binder to said bulk supply, and agitating the bulk supply while forming the fresh emulsion.

5. A process of making emulsion, consisting in first forming a bulk supply by making an aqueous water and an emulsifying agent, adding a waterproof bituminous binder, thoroughly mixing these ingredients into an emulsion, in which the binder forms the internal phase and the emulsifying agent and water the external phase, feeding regulated quantities of the emulsifying agent, water and binder to said bulk supply and agitating the bulk supply while forming the fresh emulsion.

6. A process of making an emulsion, consisting in first forming a bulk supply by making an aqueous mixture of water and colloidal clay, adding a waterproof adhesive binder, thoroughly mixing these ingredients into an emulsion in which the binder forms the internal phase and the emulsifying agent and water the external phase, feeding additional water and colloidal clay, and also separately feeding the binder to said bulk supply and agitating the bulk supply while forming the emulsion.

LESTER KIRSCHBRAUN.